(12) United States Patent
Harich

(10) Patent No.: US 12,704,150 B2
(45) **Date of Patent: *Aug. 11, 2026**

(54) BEARING ARRANGEMENT FOR A ROTATING COMPONENT OF A WIND TURBINE

(71) Applicant: Nordex Energy SE & Co. KG, Hamburg (DE)

(72) Inventor: Martin Harich, Tornesch (DE)

(73) Assignee: Nordex Energy SE & Co. KG, Hamburg (DE)

( * ) Notice: Subject to any disclaimer, the term of this patent is extended or adjusted under 35 U.S.C. 154(b) by 85 days.

This patent is subject to a terminal disclaimer.

(21) Appl. No.: 18/737,792

(22) Filed: Jun. 7, 2024

(65) Prior Publication Data

US 2024/0410420 A1 Dec. 12, 2024

(30) Foreign Application Priority Data

Jun. 9, 2023 (EP) .................................... 23178381

(51) Int. Cl.
*F16C 25/06* (2006.01)

(52) U.S. Cl.
CPC .......... *F16C 25/06* (2013.01); *F16C 2233/00* (2013.01); *F16C 2360/31* (2013.01)

(58) Field of Classification Search
CPC ............................ F16C 25/06; F16C 2233/00
See application file for complete search history.

(56) References Cited

U.S. PATENT DOCUMENTS 4,571,097 A * 2/1986 Lee ....................... F16C 19/364 384/469
12,066,059 B2 * 8/2024 Marunaka ............. F16C 43/065
2014/0199004 A1 7/2014 Smith

FOREIGN PATENT DOCUMENTS

DE 102013226552 B3 * 5/2015 ........... B25B 27/064
DE 10 2017 125 550 A1 5/2019
DE 10 2020 133 993 A1 6/2022
EP 1 745 221 B1 10/2008

(Continued)

OTHER PUBLICATIONS

Extended European Search Report of the European Patent Office dated Nov. 3, 2023 of European application No. 23178381.2 on which this application is based.

(Continued)

*Primary Examiner* — James Pilkington
(74) *Attorney, Agent, or Firm* — Walter Ottesen, P.A.

(57) ABSTRACT

A bearing arrangement for a rotating component of a wind turbine includes a first roller bearing and a second roller bearing. The rotating component defines a rotational axis and is supported by the first roller bearing and the second roller bearing. A bearing housing supports the roller bearing. The first roller bearing, the second roller bearing, the rotating component and the bearing housing are arranged to conjointly define a pretension circuit. A first bearing outer ring is axially moveable along the rotational axis with respect to the bearing housing and/or is radially deformable with respect to the rotational axis. An actuation device extends through an opening of the bearing housing and is accessible from outside of the bearing housing. Upon actuation of the actuation device, the pretension of the bearing arrangement is adjusted.

20 Claims, 2 Drawing Sheets

(56) References Cited

FOREIGN PATENT DOCUMENTS

| | | | | | |
|---|---|---|---|---|---|
| EP | 2 290 250 | A2 | | 3/2011 | |
| EP | 2 801 729 | A2 | | 11/2014 | |
| EP | 2 710 271 | B1 | | 12/2014 | |
| EP | 2 999 894 | B1 | | 2/2018 | |
| GB | 2 172 939 | A | | 10/1986 | |
| JP | 2006-177268 | A | | 7/2006 | |
| WO | 2011/033256 | A1 | | 3/2011 | |
| WO | 2017/147766 | A1 | | 9/2017 | |
| WO | WO-2019156720 | A1 | * | 8/2019 | .............. F16C 41/04 |
| WO | 2023/045294 | A1 | | 3/2023 | |

OTHER PUBLICATIONS

Office Action of the European Patent Office dated Jan. 9, 2026 for the priority application EP 23178381.2 on which this application is based.

* cited by examiner

BEARING ARRANGEMENT FOR A ROTATING COMPONENT OF A WIND TURBINE

CROSS-REFERENCE TO RELATED APPLICATIONS

This application claims priority of European patent application no. 23178381.2, filed Jun. 9, 2023, the entire content of which is incorporated herein by reference.

BACKGROUND

Wind turbines with wind turbine rotor blades (hereinafter also referred to as rotor blades) are well known in the prior art and are used to generate energy and are used to convert wind energy into electrical energy.

In wind turbines, there are direct drive concepts in which the rotational motion of the rotor hub is transmitted directly and immediately to a rotating shaft of a generator. Alternatively, there are drive train concepts in which a gearbox is connected between the rotor hub and the generator, wherein the gearbox is connected to the rotor hub via a rotor shaft.

A technical challenge for wind turbines of this type, which are configured for a power range of several megawatts of electrical power, for example, is the provision of a bearing arrangement that meets high technical requirements, such as high bending stiffness, a clearance-free bearing arrangement, low-wear kinematics and the simplest possible assembly combined with high cost-efficiency.

It is known to use roller bearings, for example, tapered roller bearings, to support rotating components of wind turbines, like the rotor shaft. Some roller bearings such as tapered roller bearings are configured to work in pairs. These tapered roller bearings are pretensioned, which means that even with no external load they have a minimum load to allow all rolling elements of the roller bearings to interact with the raceways. This is advantageous in terms of load distribution and contributes to an improved lifetime. This pretension should be kept within narrow limits so that, on the one hand, the positive effect of all rolling elements being in contact with the raceways is ensured and, on the other hand, the roller bearings are not overloaded.

SUMMARY

It is an object of the disclosure to develop and provide a bearing arrangement to support a rotating element of a wind turbine, which contributes to an efficient adjustment of the level of pretension.

A bearing arrangement is disclosed, in particular a rotor bearing arrangement, for a rotating component of a wind turbine, in particular for a rotor shaft. The bearing arrangement includes a first roller bearing and a second roller bearing. The bearing arrangement includes the rotating component having a rotational axis, wherein the rotating component is supported by the first roller bearing and the second roller bearing. A bearing housing is provided to support the first roller bearing and the second roller bearing. The first roller bearing, the second roller bearing, the rotating component and the bearing housing are arranged to form a pretension circuit. The first roller bearing includes a first bearing inner ring, a first bearing outer ring and rolling elements arranged between the first bearing inner ring and the first bearing outer ring. The first bearing outer ring is axially moveable along the rotational axis with respect to the bearing housing and/or radially deformable with respect to the rotational axis. An actuation device is provided, which extends through an opening of the bearing housing and is accessible from outside the bearing housing, wherein upon actuation the actuation device causes an axial movement and/or a radial deformation of the first bearing outer ring to adjust the pretension of the bearing arrangement.

According to the disclosure, a pretensioning mechanism is provided, which enables the outer ring of one bearing to be moved while the inner rings of both bearings and the other outer ring of the other bearing are fixed. As indicated above, a predetermined pretension of the bearing arrangement is necessary as indicated above and is initially set, for example, during assembly or installation in the field. For example, a mean value of pretension is used as a reference value. For different reasons, an adjustment of the pretension can be necessary, for example due to wear. Therefore, it is necessary and advantageous to control and adjust the level of pretension, not only during the production/mounting, but even during operation/maintenance. The disclosure provides an easy adjustment of the pretension, not only during assembly of the bearing arrangement, but in particular during operation/maintenance of an installed wind turbine in order to set a desired level of pretension. For this purpose, the actuation device is actuated, whereby a force is transferred onto the first bearing outer ring for its movement. For example, if a deviation from the predetermined pretension is detected, it can be easily corrected via the actuation device.

The inventive bearing arrangement has several advantages, for example:

The actuation device is accessible from outside the bearing housing without having to dismantle/detach sub-assemblies, for example, the gearbox. In other words, the arrangement of the actuation device enables the adjustment of the pretension without accessing the bearing arrangement from the gearbox side, more specifically the inner ring at the gearbox side. Free access to the actuation device is provided. This is particularly advantageous for drive train concepts in which the bearing housing, in particular the rotor bearing housing, is connected to or arranged close to the gearbox when the gearbox is in an installed state, such that little/no space is available for accessing the inner ring at the gearbox side.

In particular, the disclosure enables that the actuation of the actuation device does not involve any contact/access to rotating parts of the drive train. Thus, the actuation can be performed by a technician even during operation of the wind turbine (that is, wind turbine does not need to be stopped to comply with health and safety requirements).

The described bearing arrangement contributes to a comparatively less expensive, quick, easy, and time-efficient solution. Particularly, an adjustment of the pretension, even during operation of the wind turbine, can be carried out manually by maintenance personnel using the actuation device. Alternatively, such adjustments can be carried out using an automatic tool upon receiving a corresponding actuation signal, for example, based on pretension measurements of one or more respective sensors (see below). Such adjustments can be easily carried out, for example, on a regular basis or depending on pretension measurements. For example, one or more sensors (see further embodiment below) can be provided for measuring the pretension of the bearing arrangement and an adjustment of the pretension can be carried out based thereon. In particular with respect to adjustments carried out during maintenance, the idle time of the wind turbine can be significantly reduced.

In the case that several actuation devices are provided, the number of actuation devices is customizable, for example, depending on load level.

The first roller bearing and the second roller bearing can be distant from one another in the axial direction. The first roller bearing is preferably the rear bearing, meaning that the first roller bearing is arranged at a gear box side, facing the gear box of the wind turbine. The second bearing includes a second bearing inner ring, a second bearing outer ring, and rolling elements therebetween. The second roller bearing is preferably facing the rotor side.

With regard to the introductory explanation, the pretension circuit means that the two roller bearings, for example, tapered roller bearings, the rotating component and the bearing housing are formed and configured such that these elements can be/are pretensioned against each other.

The bearing housing is the outer housing, being arranged facing the outside of the bearing arrangement. In other words, the bearing housing is arranged away from the rotational axis.

The mentioned opening goes through an entire wall (portion) of the bearing housing, for example, in contrast to a blind hole. The opening is configured such that actuation of the actuation device is possible. In other words, the opening needs to be large enough to allow actuation, that is, movement, of the actuation device. For example, the opening is slit-shaped and runs over at least a portion of the bearing housing circumferentially around the rotational axis.

The first bearing outer ring is axially moveable along the rotational axis, which means along a direction parallel to the rotational axis. Alternatively or additionally, the first bearing outer ring is deformed in a radial direction with respect to the rotational axis. In any case, the movement or deformation is caused by actuation of the actuation device, wherein a mechanical force is transferred onto the first bearing outer ring, either directly or indirectly.

The actuation device is or includes a moveable element. In other words, due to movement of the actuation device, a force is transferred to the first bearing outer ring. In particular, the actuation device is actuated to act on a further element within the bearing housing, in order that a force acting on the first bearing outer ring is adjusted or set. For example, the actuation device is a tool including a lever to set or adjust the pretension. For example, the actuation device is moved circumferentially and/or radially with respect to the rotational axis. For example, the force, which is provided by the further element onto the first bearing outer ring, remains after actuation of the actuation device, since the force depends on the further element, for example, its movement and set position.

Instead of one single actuation device, several actuation devices can be provided, for example, arranged along the circumference of the first bearing outer ring.

According to an embodiment, the actuation device is located between the first roller bearing and the second roller bearing with respect to the rotational axis. This contributes to the above-mentioned advantages, in particular the actuation device can be easily accessed from outside the bearing housing and it is not necessary to access the actuation device from the gear box side.

According to an embodiment, a pretension ring is provided within the bearing housing, the pretension ring being in threaded engagement with the bearing housing, wherein upon actuation the actuation device causes an axial movement and/or a radial deformation of the first bearing outer ring by turning the pretension ring around the rotational axis. The pretension ring is a separate element withing the bearing housing, which is threadedly engaged with the bearing housing, for example, on an outer side facing way from the rotational axis. A screw axis of the pretension ring is at least parallel to the rotational axis, preferable coaxial with the rotational axis. Thus, by turning the pretension ring, the pretension ring moves axially along the rotational axis to interact with the first bearing outer housing. For example, this embodiment provides a very precise and reliable solution for pretensioning the bearing arrangement. As an advantage, only a little number of actuation devices is needed, for example only one or two, the latter spaced apart by 180° around the rotational axis. Thus, only few, for example, one, actuation device needs to be operated for adjusting the bearing pretension. This would be very easy for a technician in case of a manual operation.

According to an embodiment, the pretension ring is arranged between the bearing housing and the first bearing outer ring. For example, the pretension ring is in contact on the one hand with the bearing housing and on the other hand with the first bearing outer ring. Optionally, the pretension ring is arranged between the first roller bearing and the second roller bearing in an axial direction with respect to the rotational axis. This contributes to the above functions and advantages.

According to an embodiment, the actuation device is connected to the pretension ring via a screw connection or a form-fitting connection. This enables a detachable mechanical connection, wherein the actuation device could be easily dismantled, for example, to be replaced, to be used for another bearing arrangement or the like. As the pretension ring maintains the pretension of the bearing arrangement, the actuation device does not need to remain connected to the pretension ring after actuation.

According to an embodiment, the pretension ring includes an outer threaded surface, wherein the bearing housing includes an inner threaded surface engaging with the outer threaded surface, wherein the outer threaded surface and the inner threaded surface extend in an axial direction with respect to the rotational axis. Thus, due to the axially extending threaded surfaces, if the pretension ring is turned, the pretension ring moves axially with respect to the rotational axis.

According to an embodiment, a force transfer element is provided between the pretension ring and the first bearing outer ring, such that a force, which is set or adjusted upon actuation of the actuation device, can be transferred between the actuation device and the first bearing outer ring. Thus, a force generated by actuating the actuation device and thereby moving the pretension ring is transferred from the force transfer element to the first bearing outer ring. For example, by providing the force transfer element, a set or adjusted force can be spread evenly or more evenly by the force transfer element to the first bearing outer ring. In an embodiment, the force transfer element is a ring-shaped element surrounding the rotational axis, in particular a pressure ring or washer.

According to an embodiment, the pretension ring and the force transfer element together include a contact interface which is inclined with regard to the rotational axis. The inclined contact surface serves the purpose of diverting the direction of movement in another direction via the oblique interface upon actuation of the actuation device. In other words, the pretension ring and the force transfer element interact together in a form-fit manner causing the force transfer element and thus the bearing outer ring to deform in another direction than the direction of movement of the pretension ring upon actuation of the actuation device. For example, the pretension ring and the force transfer element have a wedge-shaped surface (interface) at their common interface. For example, the axial movement of the pretension ring (due to actuation of the actuation device) is converted at least partially to a radial deformation of the bearing outer ring. Thus, a radial deformation of the first bearing outer ring can be adjusted. At least partially means that only a radial deformation or a combination of a radial deformation and an axial movement of the first bearing outer ring can be generated.

According to an embodiment, the actuation device essentially extends in a radial direction with respect to the rotational axis. Thus, the actuation device extends in radial direction out of the bearing housing with respect to the rotational axis. However, an angled orientation of the actuation device is also conceivable. Thus, the actuation device may be oriented radially, axially, or oblique with respect to the rotational axis. Thus, the configuration and manufacturing process of the bearing arrangement is very flexible, wherein, for example, depending on the environment of the bearing arrangement, the orientation of the actuation device can be adapted.

According to an embodiment, the actuation device includes a connecting element and an actuation element. For example, the connecting element extends through the opening of the bearing housing. Thus, actuating the actuation device is very easy and high transmission forces can be achieved. The actuation element is, for example, a hydraulic cylinder, a spring element or a turnbuckle and can be operated automatically or manually. The connecting element is, for example a lever or a rod.

According to an embodiment, the actuation device is configured to be turned circumferentially around the rotational axis, as already indicated above.

According to an embodiment, the opening extends circumferentially in the bearing housing round the rotational axis, as already indicated above.

According to an embodiment, a further actuation device is provided, wherein, upon actuation, the further actuation device causes an axial movement and/or a radial deformation of the first bearing inner ring to adjust the pretension of the bearing arrangement. For example, both actuation devices (or even more) are connected to the pretension ring to move it. Thus, more points of attack are given to move, that is, turn, the pretension ring, for example.

According to an embodiment, an abutment element is provided at the bearing housing in the region of the actuation device or at the actuation device itself, so that actuation of the actuation device is geometrically limited. Thus, the movement, for example, turning, of the actuation device is geometrically limited. The geometric limitation enables a defined rotation of the actuation device, for example, a defined rotation angle. Thus, a defined movement of the pretension ring, for example, is achieved. This leads at least to a defined displacement of the first bearing outer ring (optionally to a defined displacement of a force transfer element) and results in a defined preload path, for example, 0.02 mm. Thus, a precise and controlled setting/readjustment of the preload of the bearing arrangement is possible. For example, the opening defines or forms the abutment element. The opening thus automatically limits the movement, for example, the turn angle, of the actuation device. Another advantage is that the flange to accommodate the threads can be configured smaller with less additional material.

According to an embodiment, the actuation device or the pretension ring includes a sensor for measuring a parameter representative for a pretensioning state of the bearing arrangement, wherein in particular the sensor is configured as a strain gauge. For example, the sensor is arranged at or within the actuation device and is configured to measure a parameter representative for a pretensioning state of the bearing arrangement during actuation of the actuation device. In another example, the sensor is arranged at or within the pretension ring and is configured to measure a parameter representative for a pretension state of the bearing arrangement before, during and/or after actuation of the actuation device. Via the sensor, an adjustment of the pretension can be based on a deviation of a current pretension value detected by the sensor.

According to an embodiment, a plurality of actuation devices is provided relative to the circumference of the first bearing outer ring. Thus, the bearing pretension is adjusted by actuating the plurality of actuation devices, as indicated above.

According to an embodiment, an adjustment device is provided, wherein the adjustment device, upon actuation, causes an axial movement and/or a radial deformation of the first bearing inner ring to adjust the pretension of the bearing arrangement. This is particularly advantageous if the first bearing inner ring is axially moveable. Thus, a combination of adjustments is provided, wherein the first bearing inner ring and the first bearing outer ring can be adjusted on an individual basis. Thus, a very accurate adjustment of the pretension of the bearing arrangement can be achieved. Furthermore, the adjustment may selectively be carried out via the actuation device or via adjustment device, depending on the circumstances. For example, the adjustment may be carried out via the actuation device during operation/maintenance of the installed wind turbine, in particular when the gearbox is in an installation state. For example, the adjustment may be carried out via the adjustment device during production and/or assembly of the bearing arrangement, in particular when the gearbox is not in an installation state.

According to an embodiment, the actuation device, the pretension ring and/or the force transfer element and/or the bearing housing has a marking for a specific angle of rotation. Thus, actuating the actuation device, for example, turning, can be done precisely with the help of the marking to indicate a correct position of the actuation device and thus a correct pretension.

BRIEF DESCRIPTION OF DRAWINGS

The invention will now be described with reference to the drawings wherein.

DETAILED DESCRIPTION

Figure 1:
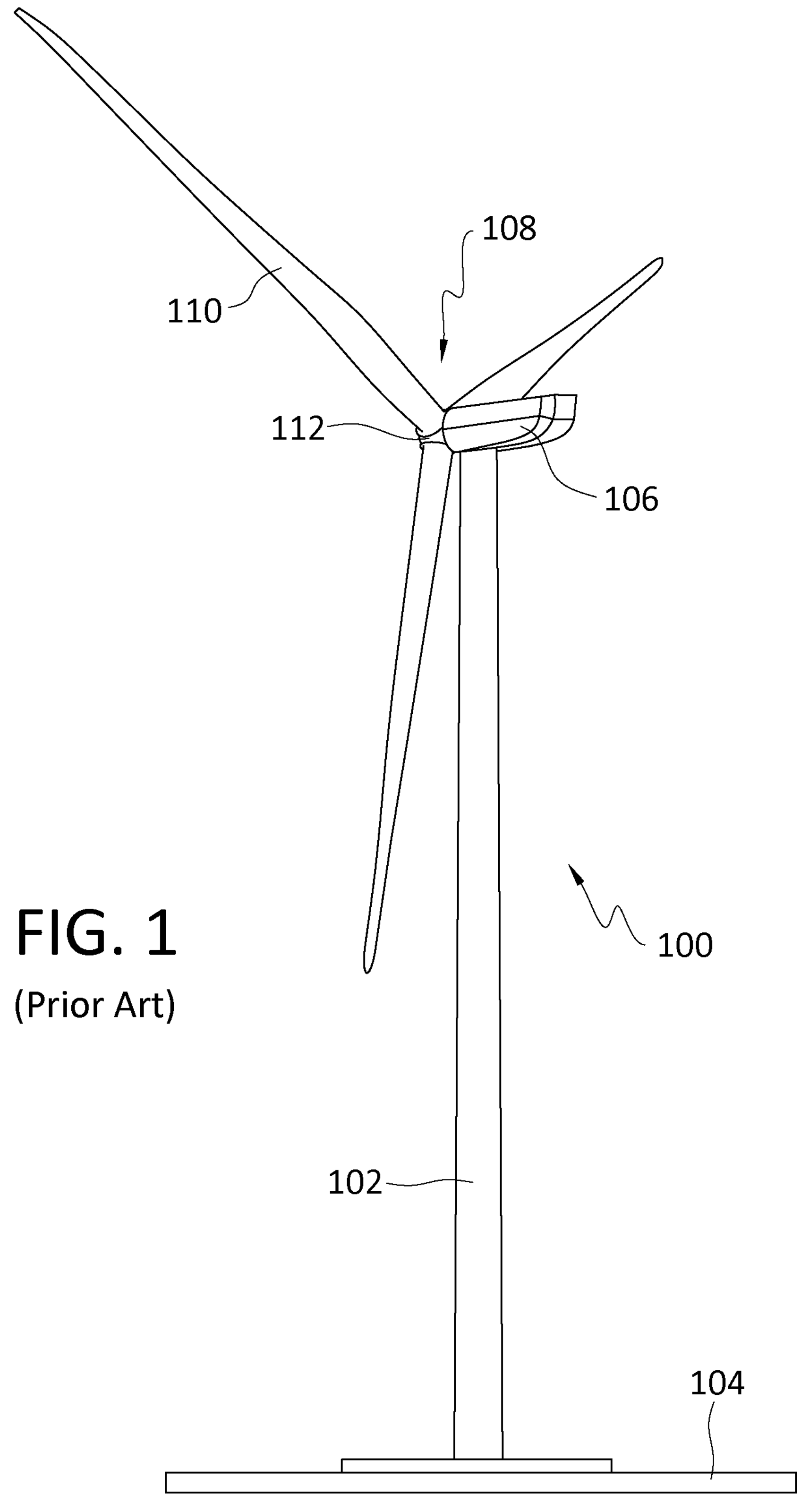
FIG. 1 shows a schematic illustration of a wind turbine.

FIG. 1 shows a schematic view of a wind turbine 100, which includes a tower 102. The tower 102 is fixed to the ground via a foundation 104. At one end of the tower 102 opposite to the ground a nacelle 106 is rotatably mounted. The nacelle 106, for example, includes a generator which is coupled to a rotor 108 via a rotor shaft (not shown). The rotor 108 includes one or more (wind turbine) rotor blades 110, which are arranged on a rotor hub 112.

During operation, the rotor 108 is set in rotation by an air flow, for example wind. This rotational movement is transmitted to the generator via the rotor shaft and, if necessary, a gearbox. The generator converts the kinetic energy of the rotor 108 into electrical energy.

Figure 2:
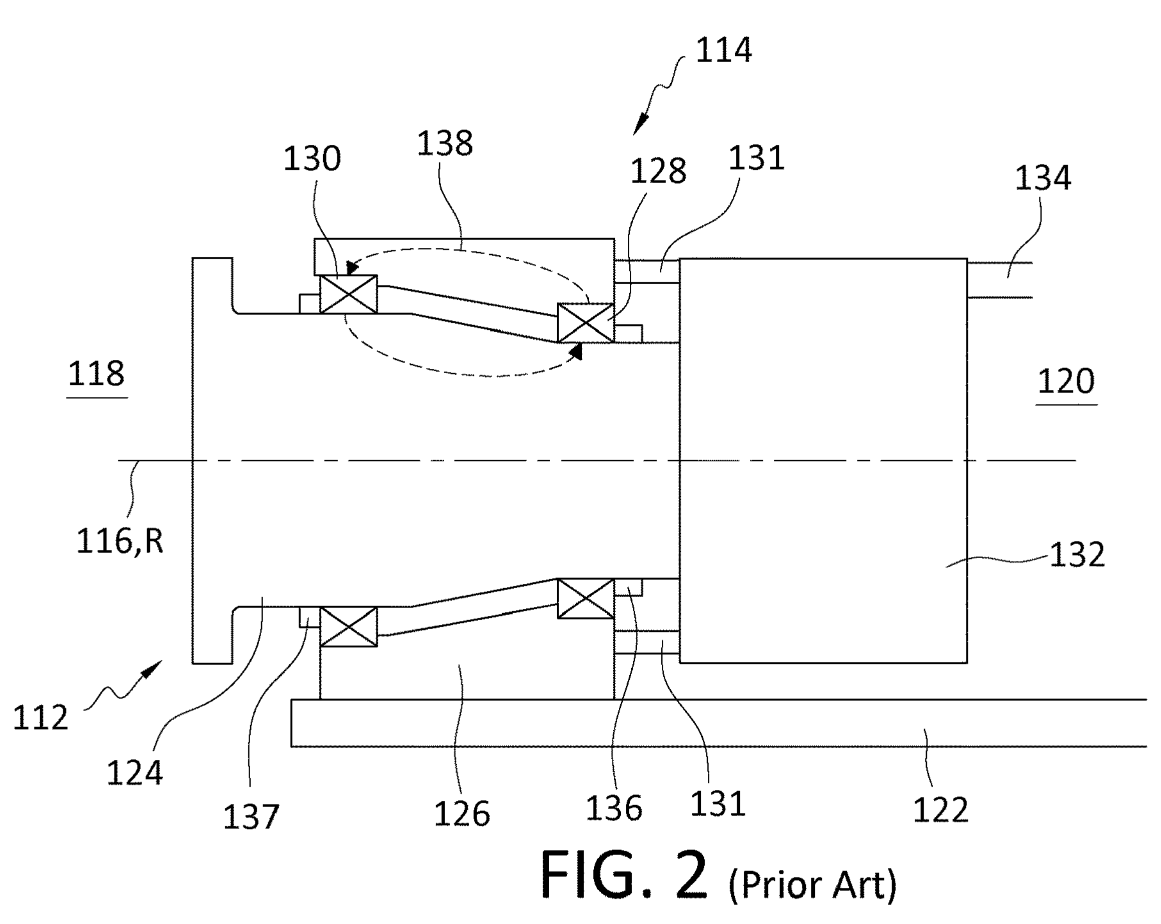
FIG. 2 shows a simplified, partial illustration of a bearing arrangement in a final mounted position with a gearbox connected between the bearing arrangement and a generator according to the prior art; and, FIGS. 3 to 6 show schematic sectional views of bearing arrangements according to embodiments of the disclosure.

FIG. 2 shows a simplified representation of an embodiment of a bearing arrangement 114 within wind turbine 100. The bearing arrangement 114 extends in the longitudinal direction 116 along an axis of rotation R from a front rotor side 118 to a rear side 120 (gearbox/generator side). The bearing arrangement 114 generally has a rotor shaft 124 connected to the rotor hub 112 (not illustrated) at the front rotor side 118 of the bearing arrangement 114. Furthermore, the bearing arrangement 114 generally has a bearing housing 126 connected to a machine frame 122. The rotor shaft 124 and the bearing housing 126 are rotatably mounted on one another via two bearings, namely a gearbox-side bearing 128 (first bearing) and a rotor-side bearing 130 (second bearing). Typically, the two bearings are tapered roller bearings. In the shown embodiment, the machine frame 122 supports the whole bearing housing 126, which can be different in other solutions.

In general, the rotor shaft 124 rotates in operation about the axis of rotation R, whereas the bearing housing 126 is fixedly connected to the machine frame 122. In the shown embodiment according to FIG. 2 the rotor shaft 124 is connected to a gearbox 132, in particular to a gearbox input shaft (not shown). The bearing housing 126 is connected to the gearbox 132, in particular to a housing of the gearbox 132, via a torque support arrangement 131. The presence of the torque support arrangement between the bearing housing 126 and the gearbox 132 renders an access to the bearing arrangement from the gearbox side difficult or impossible. The gearbox 132 is connected to a generator (not shown) via an output shaft 134 of the gearbox 132.

In an alternative non-illustrated embodiment, the bearing housing 126 is connected to a gearbox-generator assembly via a torque support arrangement. The gearbox-generator assembly corresponds in particular to a gearbox in which a generator is integrated. In a further non-illustrated embodiment, the wind turbine 100 does not include any gearbox (direct drive concept), such that the bearing housing 126 is connected to a generator via a torque support arrangement.

Referring again to the embodiment of FIG. 2, at the first bearing 128 at the tapered end of the rotor shaft 124, a pretensioning member configured as a pretension ring 136 is arranged which acts on the respective first bearing 128 in the longitudinal direction 116 with a biasing force, so that the entire bearing arrangement 114 is biased and thus no clearance is provided in both the axial direction and in the radial direction with respect to the axis of rotation R. The pretensioning member may alternatively be configured for example, as a shaft nut. The pretensioning force generated by the pretension ring 136 is transmitted via the respective first bearing 128 on the bearing housing 126, from there via the opposite second bearing 130 on the rotor shaft 124. The rotor shaft 124 typically includes a shoulder 137 which serves as an axial abutment for the second bearing 130 on the front rotor side 118. The pretensioning force is then transmitted from the rotor shaft 124 back to the first bearing 128. A pretension circuit 138 is formed by these components, which is exemplified by the dotted lines in FIG. 2.

The bearing arrangement 114 including rotor shaft 124, bearing housing 126, bearings 128, 130 and pretension ring 136 is typically a preassembled unit, which is typically supplied in the assembled state to the site of the wind turbine and is finally mounted there with the rotor hub 112 and the machine frame 122. Alternately, at least part of the components of the bearing arrangement 114 may be separately supplied to the site of the wind turbine and assembled to the remaining components of the bearing arrangement 114 on site.

Following the above, FIG. 2 illustrates the issue of accessibility to the inner ring of bearing 128.

In the following, embodiments of the disclosure are described which focus on an improved pretensioning mechanism.

Figure 3:
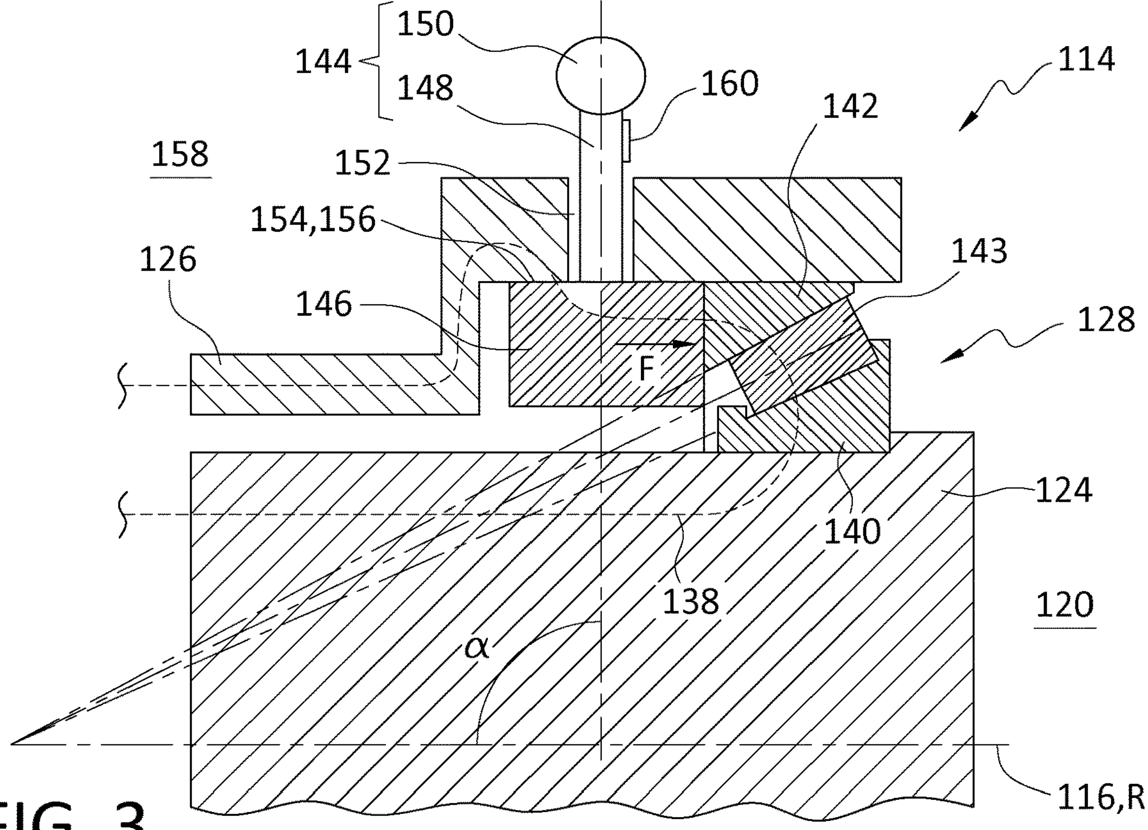

FIG. 3 shows a schematic bearing arrangement 114 according to an embodiment of the disclosure. The bearing arrangement 114 is generally of the type as described with reference to FIG. 2 above. The bearing arrangement 114 has a bearing housing 126, a rotor shaft 124 (corresponding to a rotating component), a first roller bearing 128 and a second roller bearing 130 (not shown for the sake of overview). The bearing arrangement 114 has a longitudinal axis 116 and the rotor shaft 124 rotates around a rotational axis R. The bearing housing 126 supports the first and the second roller bearings 128 and 130. The first and the second roller bearings 128 and 130 support the rotor shaft 124. The first roller bearing 128 and the second roller bearing 130 are tapered roller bearings and arranged in the so-called “O”-arrangement. The first roller bearing 128 is arranged at the rear side 120 (generator side or gearbox side). At the rear side, the rotor shaft 124 is connected to a gearbox (not shown). The first roller bearing 128 includes a first bearing inner ring 140, a first bearing outer ring 142 and a plurality of rolling elements 143 arranged and supported between the first bearing inner ring 140 and the first bearing outer ring 142.

In an installed state within a wind turbine 100, the bearing arrangement 114 is operated such that a rotation of the rotor 108 drives the rotor shaft 124. The rotation of the rotor shaft 124 is transferred to the gearbox, via which a generator is driven to generate electrical energy.

The bearing arrangement 114 of FIG. 3 is generally pretensioned as described above and in accordance with FIG. 2. In this regard, the first roller bearing 128, the second roller bearing 130, the rotor shaft 124 and the bearing housing 126 are configured and arranged to form a pretension circuit 138.

In order to set/adjust the pretension of the bearing arrangement 114, that is, to adjust the pretension of the formed pretension circuit 138, the first bearing outer ring 142 can be axially moved. For this purpose, the bearing arrangement 114 includes an actuation device 144 and a pretension ring 146.

In the shown embodiment, the actuation device 144 includes a connecting element 148 and an actuation element 150. The connecting element 148 is a lever or a shaft. The actuation element 150 is a hydraulic cylinder. The actuation device 144 essentially extends in a radial direction with respect to the rotational axis (R).

Via the connecting element 148, the actuation device 144 is mechanically and fixedly connected to the pretension ring 146, for example, via a screw connection or a form-fit connection. The connecting element 148 extends radially through an opening 152 of the bearing housing 126.

In the shown embodiment, the pretension ring 146 is a ring-shaped element, for example, washer-like, and is arranged within the bearing housing 126. The pretension ring 146 surrounds the rotor shaft 124. The pretension ring 146 is provided between the bearing housing 126 and the first bearing outer ring 142 along the axial direction. The pretension ring 146 is in threaded engagement with the bearing housing 126. In this regard, the pretension ring 146 includes an outer threaded surface 154. In other words, the pretension ring 146 includes an outer surface with an outer thread. The bearing housing 126 includes an inner threaded surface 156. In other words, the bearing housing 126 includes an inner surface with an inner thread. Thus, the pretension ring 146 and the bearing housing 126 are connected via the threaded connection.

Upon actuation of the actuation device 144 an axial movement of the first bearing outer ring 142 is caused. More precisely, the actuation of the actuating element 150 turns the connecting element 148 around the rotational axis R. Due to the connection to the pretension ring 146, the movement of the connecting element 148 directly turns the pretension ring 146 circumferentially around the rotational axis R. Thus, torque is applied to the pretension ring 146. Due to the threaded connection, the turning of the pretension ring 146 causes an axial movement of the pretension ring 146. Thus, an axial force F is exerted on the first bearing outer ring 142, due to direct contact of the pretension ring 146 and the first bearing outer ring 142. The pretension ring 146 is configured to distribute the load evenly on the first bearing outer ring 142.

To increase the pretension of the bearing arrangement 114, the pretension ring 146 is actuated (turned) such that it is moved (further) against the first bearing outer ring 142 (towards the right in FIG. 3). This causes an axial movement/displacement of the first bearing outer ring 142 and thus impacts the pretension circuit 138. The pretension of the bearing arrangement 114 is thus adjusted.

Similarly, the pretension ring 146 can be actuated such that it is moved away from the first bearing outer ring 142 (towards the left in FIG. 3), meaning that the pretension can be reduced.

The opening 152 in the bearing housing 126 is slit-like and extends circumferentially over a portion of the bearing housing 126 around the rotational axis R. The dimensions of the opening 152 are larger than the width of the connecting element 148, such that the connecting element 148 can be moved within the opening 152 along the circumferential direction. For example, the opening 152 may allow a turning of the connecting element 148 within a range of 10° along the circumferential direction.

As can be seen from FIG. 3, the actuation device 144 is arranged between the first roller bearing 128 and the second roller bearing. Thus, the actuation device 144 is easily accessible from outside 158 of the bearing arrangement 114. For adjustment of the pretension it is thus not necessary to gain access from the rear (gearbox) side 120, which is particularly problematic after the bearing arrangement 114 has been installed in the wind turbine 100 and/or during operation of the wind turbine 100.

Further, a very precise adjustment of the pretension is possible by the thread of the pretension ring 146. Preferably, a fine thread is used to allow fine tuning of the pretension, that is, only fractions of a millimeter.

FIG. 4 shows a further embodiment of the disclosure, which differs regarding the actuation device 144 and the adjustment of the pretension. Thus, the above description of the features similarly applies, unless otherwise stated below. For the sake of clarity, not all reference signs may necessarily be reproduced in the figures and described again.

In the embodiment according to FIG. 4 the pretension ring 146 is provided between the bearing housing 126 and the first bearing outer ring 142 mainly along the radial direction. The pretension ring 146 includes a shoulder 162, which partially surrounds the first bearing outer ring 142 and thereby forms a form-fit engagement in the axial direction with respect to the rotational axis R. Thus, by turning the pretension ring 146 as described above, the axial movement of the pretension ring 146 causes the axial movement of the first bearing outer ring 142 due to the engagement of the shoulder 162.

FIG. 5 shows a further embodiment of the disclosure, which differs regarding the actuation device 144 and the adjustment of the pretension. Thus, the above description of the features similarly applies, unless otherwise stated below. For the sake of clarity, not all reference signs may necessarily be reproduced in the figures and described again.

The embodiment according to FIG. 5 essentially resembles the embodiment according to FIG. 3, wherein further a force transfer element 164 is arranged between the pretension ring 146 and the first bearing outer ring 142. In the embodiment as shown, the force transfer element 164 is arranged axially between the respective components with respect to the rotational axis R. Alternatively, with respect to the FIG. 4 for example, it can be arranged radially between the respective components. The force transfer element 156 is a ring-shaped member extending circumferentially around the rotational axis R. For example, the force transfer element 156 is washer-like and can also be called a pressure ring. The force transfer element 156 is axially moveable. Since the force transfer element 156 is moveable parallel to the rotational axis R, the force F generated by actuating the pretension ring 146 is transferred onto the first bearing outer ring 142.

FIG. 6 shows a further embodiment of the disclosure, which differs regarding the actuation device 144 and the adjustment of the pretension. Thus, the above description of the features similarly applies, unless otherwise stated below. For the sake of clarity, not all reference signs may necessarily be reproduced in the figures and described again.

The embodiment according to FIG. 6 essentially resembles the embodiment according to FIG. 4, wherein again a force transfer element 164 is provided. The pretension ring 146 and the force transfer element 164 are arranged and configured such that these elements form together a contact interface 166 which is inclined with regard to the rotational axis R. In other words, the contact interface 166 is a contact area running inclined with respect to extension direction of the actuation element 144, which is radial. Thus, the force transfer element 164 and the pretension ring 146 contact each other in a wedge-shaped manner. It is noted that the transfer element 164 includes an optional inner shoulder 168 (also named step or ring section) to fix the first bearing outer ring 142 in axial direction, in particular against the bearing housing 126.

By actuating the actuation device 144, that is, by turning it around the rotational axis R as described above, the pretension ring 146 is turned, wherein due to the inclined contact interface 166 a generated force is redirected such that the force transfer element 156 radially transfers a resulting force F onto the first bearing outer ring 142 in order to move/displace the first bearing outer ring 142 radially. Thus, the pretension of the bearing arrangement 114 can be adjusted, analogously as described above.

The embodiment thus provides for an adjustment of pretension by radially compressing the force transfer element 164 and thus the first bearing outer ring 142. The axial position of the first bearing outer ring 142 is preferably stationarily fixed. A fine tuning of pretension is provided by the wedged contact surface 166.

Optionally, the force transfer element 164 could be formed in segments, as a one-piece ring of large diameter may lead to undesired deformations due to their own weight. Furthermore, the segmenting of the force transfer element 164 could provide a better handling. The segments could be spaced from one another. The gap width between two neighboring segments would then be dependent on the deformation of the segments in circumferential direction. Alternatively, the segments could be connected to one another via flexible connectors.

In the above-described embodiments, the actuation device 144 is constantly connected to the pretension ring 146. Alternatively, the actuation device 144 may only be connected to the pretension ring 146 when the actuation device 144 is meant to be operated for adjusting the pretension.

In the above-described embodiments, the actuation device 144 extends radially, at least from the connecting element 148. Thus, an angle α with respect to the rotational axis R is 90°. However, an angled orientation of the actuation device 144 is also conceivable. Thus, the actuation device 144 may be oriented radially, axially, or oblique with respect to the rotational axis R.

Optionally with respect to the above embodiments, in a not-shown embodiment, one or more abutment elements are provided at the bearing housing 126 in the region of the actuation device 144 or at the actuation device 144 itself, so that actuation of the actuation device is geometrically limited. Thus, the movement, for example, turning, of the actuation device 144 is geometrically limited. The geometric limitation enables the above-mentioned functions and advantages. For example, the opening 152 defines or forms the abutment element, for example, by its surrounding walls. The opening 152 thus automatically limits the movement, for example, the turn angle, of the actuation device 144, in particular the connecting element 148.

In the above-described embodiments, optionally a described actuation device 144 may include a sensor 160, as exemplarily indicated in FIG. 3. The sensor 160 is, for example, a strain gauge and configured to measure a parameter representative for a pretensioning state of the bearing arrangement 114. Based on the sensor's measurement, the pretension of the bearing arrangement 114 is adjusted as described above, which can either be manually or automatically. Additionally or alternatively, the sensor 160 is provided at the pretension ring 146.

Optionally, in the embodiments as described above, an adjustment device, for example, a screw, grub screw, nut, pretension ring, hydraulic device, can be provided in addition to the actuation device 144. The adjustment device is provided to act on the first bearing inner ring 140 as described above (see for example the pretension ring 136 according to FIG. 2). Optionally, several adjustment devices can be provided.

Although reference is made to only one actuation device 144, a plurality of actuation devices 144 can be provided, as described in the introductory section. For example, two actuation devices 144 being distant to each other about 180° along the circumference of the bearing housing 126, are provided, each of them being connected to the pretension ring 146 as described above. Thus, for example, moving of the pretension ring 146 and thus adjusting the pretension is made easier.

It should be mentioned that the described embodiments are not restricted to special details of the bearings and/or the bearing arrangement, for example concerning the configuration of the shaft 124 or the configuration of the bearing housing 126. The provision of one or more actuation devices 144 which allow for easy adjustment of the bearing pretension from outside the bearing housing is essential, even after an initial installation in the wind turbine or during operation of the wind turbine.

It is understood that the foregoing description is that of the preferred embodiments of the invention and that various changes and modifications may be made thereto without departing from the spirit and scope of the invention as defined in the appended claims.

| Reference signs | |
|---|---|
| 100 | wind turbine |
| 102 | tower |
| 104 | foundation |
| 106 | nacelle |
| 108 | rotor |
| 110 | rotor blade |
| 112 | rotor hub |
| 114 | bearing arrangement |
| 116 | longitudinal direction |
| 118 | front rotor side |
| 120 | rear side |
| 122 | machine frame |
| 124 | rotor shaft |
| 126 | bearing housing |
| 128 | first bearing |
| 130 | second bearing |
| 131 | torque support arrangement |
| 132 | gearbox |
| 134 | output shaft |
| 136 | pretension ring |
| 137 | shoulder |
| 138 | pretension circuit |
| 140 | first bearing inner ring |
| 142 | first bearing outer ring |
| 143 | rolling element |
| 144 | actuation device |
| 146 | pretension ring |
| 148 | connecting element |
| 150 | actuation element |
| 152 | opening |
| 154 | outer threaded surface |
| 156 | inner threaded surface |
| 158 | outside |
| 160 | sensor |
| 162 | shoulder |
| 164 | force transfer element |
| 166 | contact interface |
| 168 | inner shoulder |
| F | force |
| R | rotational axis |
| α | angle |

The invention claimed is:

1. A bearing arrangement for a rotating component of a wind turbine, the bearing arrangement comprising:

a first roller bearing and a second roller bearing;

said rotating component defining a rotational axis and being supported by said first roller bearing and said second roller bearing;

a bearing housing supporting said first roller bearing and said second roller bearing;

said first roller bearing, said second roller bearing, said rotating component and said bearing housing being arranged to form a pretension circuit;

said first roller bearing including a first bearing inner ring, a first bearing outer ring and rolling elements arranged between said first bearing inner ring and said first bearing outer ring;

said second roller bearing including a second bearing inner ring, a second bearing outer ring, and rolling elements arranged between said second bearing inner ring and said second bearing outer ring;

said first roller bearing and said second roller bearing being distant from one another in the axial direction along the rotational axis;

said first bearing outer ring being so arranged that at least one of the following is applicable:

i) said first bearing outer ring being axially moveable along said rotational axis with respect to said bearing housing; and ii) said first bearing outer ring being radially deformable with respect to said rotational axis;

said bearing housing having an opening formed therein;

an actuation device extending through said opening and being accessible from outside said bearing housing; and, upon actuation, said actuation device being configured so as to cause at least one of the following:

i) an axial movement of said first bearing outer ring to adjust said position of said bearing arrangement; and, ii) a radial deformation of said first bearing outer ring to adjust a pretension of said bearing arrangement.

2. The bearing arrangement of claim 1, wherein said actuation device is located between said first roller bearing and said second roller bearing with respect to the rotational axis.

3. The bearing arrangement of claim 1, wherein said actuation device extends in a radial direction with respect to said rotational axis.

4. The bearing arrangement of claim 1, wherein said actuation device includes an actuation element and a connecting element; and, said connecting element extends through said opening of the bearing housing.

5. A bearing arrangement for a rotating component of a wind turbine, the bearing arrangement comprising:

a first roller bearing and a second roller bearing;

said rotating component defining a rotational axis and being supported by said first roller bearing and said second roller bearing;

a bearing housing supporting said first roller bearing and said second roller bearing;

said first roller bearing, said second roller bearing, said rotating component and said bearing housing being arranged to form a pretension circuit;

said first roller bearing including a first bearing inner ring, a first bearing outer ring and rolling elements arranged between said first bearing inner ring and said first bearing outer ring;

said first bearing outer ring being so arranged that at least one of the following is applicable:

i) said first bearing outer ring being axially moveable along said rotational axis with respect to said bearing housing; and ii) said first bearing outer ring being radially deformable with respect to said rotational axis;

said bearing housing having an opening formed therein;

an actuation device extending through said opening and being accessible from outside said bearing housing; and, upon actuation, said actuation device being configured so as to cause at least one of the following:

i) an axial movement of said first bearing outer ring to adjust said position of said bearing arrangement; and, ii) a radial deformation of said first bearing outer ring to adjust a pretension of said bearing arrangement;

a pretension ring within said bearing housing and being in threaded engagement with said bearing housing; and, upon actuation, said actuation device being configured to cause at least one of the following:

i) an axial movement of said first bearing outer ring; and, ii) a radial deformation of said first bearing outer ring by turning said pretension ring around said rotational axis.

6. The bearing arrangement of claim 5, wherein said pretension ring is arranged between said bearing housing and said first bearing outer ring.

7. The bearing arrangement of claim 5, wherein said actuation device is connected to said pretension ring via a screw connection or a form-fitting connection.

8. The bearing arrangement according of claim 5, wherein said pretension ring includes an outer threaded surface; and, said bearing housing includes an inner threaded surface engaging with said outer threaded surface; and, said outer threaded surface and said inner threaded surface extend in an axial direction with respect to said rotational axis.

9. The bearing arrangement of claim 5, further comprising a force transfer element arranged between said pretension ring and said first bearing outer ring such that a force, which is set or adjusted upon actuation of the actuation device, can be transferred between said actuation device and said first bearing outer ring.

10. The bearing arrangement of claim 9, wherein said pretension ring and said force transfer element conjointly define a contact interface which is inclined with respect to the rotational axis.

11. The bearing arrangement of claim 5, wherein said opening extends circumferentially in the bearing housing around said rotational axis.

12. The bearing arrangement of claim 5, further comprising an adjustment device, wherein, upon actuation, said adjustment device causes an axial movement and/or a radial deformation of said first bearing inner ring to adjust said pretension of said bearing arrangement.

13. The bearing arrangement of claim 5, wherein said actuation device or said pretension ring includes a sensor for measuring a parameter representative for the pretensioning state of said bearing arrangement.

14. The bearing arrangement of claim 13, wherein said sensor is configured as a strain gauge.

15. The bearing arrangement of claim 5, wherein a plurality of actuation devices are provided such that said plurality of actuation devices are circumferentially spaced about the circumference of said first outer bearing ring.

16. The bearing arrangement of claim 5, wherein said bearing arrangement is a rotor bearing arrangement for a wind turbine.

17. The bearing arrangement of claim 5, wherein said actuation device includes an actuation element and a connecting element.

18. The bearing arrangement of claim 5, wherein said actuation device extends in a radial direction with respect to said rotational axis.

19. The bearing arrangement of claim 5, wherein said actuation device includes an actuation element and a connecting element; and, said connecting element extends through said opening of the bearing housing.

20. A bearing arrangement for a rotating component of a wind turbine, the bearing arrangement comprising:

a first roller bearing and a second roller bearing;

said rotating component defining a rotational axis and being supported by said first roller bearing and said second roller bearing;

a bearing housing supporting said first roller bearing and said second roller bearing;

said first roller bearing, said second roller bearing, said rotating component and said bearing housing being arranged to form a pretension circuit;

said first roller bearing including a first bearing inner ring, a first bearing outer ring and rolling elements arranged between said first bearing inner ring and said first bearing outer ring;

said first bearing outer ring being so arranged that at least one of the following is applicable:

i) said first bearing outer ring being axially moveable along said rotational axis with respect to said bearing housing; and ii) said first bearing outer ring being radially deformable with respect to said rotational axis;

said bearing housing having an opening formed therein;

an actuation device extending through said opening and being accessible from outside said bearing housing; and, upon actuation, said actuation device being configured so as to cause at least one of the following:

i) an axial movement of said first bearing outer ring to adjust said position of said bearing arrangement; and ii) a radial deformation of said first bearing outer ring to adjust a pretension of said bearing arrangement;

wherein said actuation device is configured to be turned circumferentially around said rotational axis.

* * * * *